May 19, 1931.  J. F. O'CONNOR  1,806,264
DRAFT GEAR
Filed July 27, 1928   2 Sheets-Sheet 1
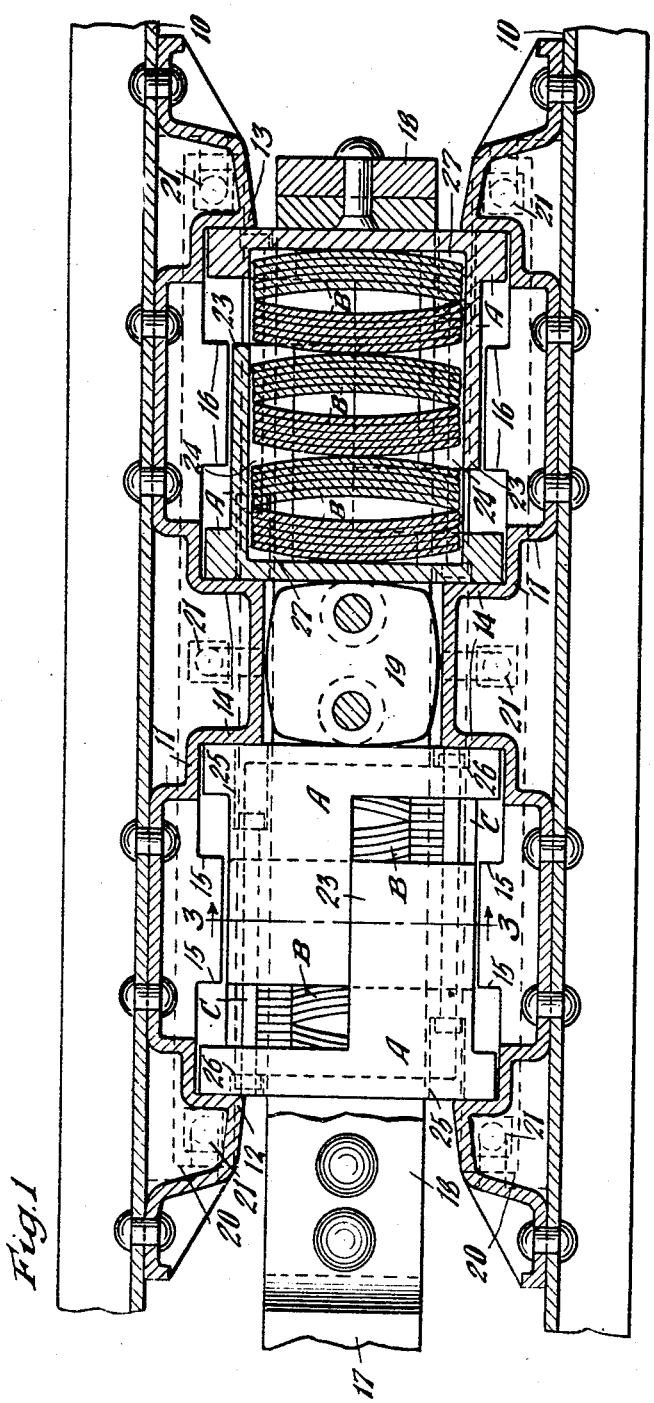
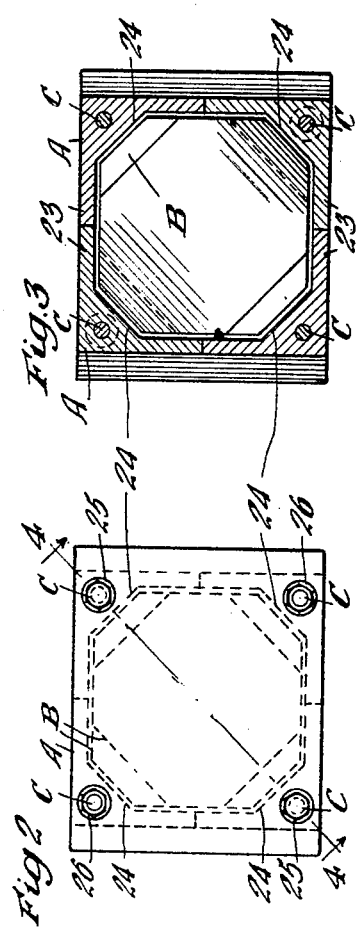
Inventor
John F. O'Connor
By Joseph Harris
His Atty.
Witness
Wm. Geiger

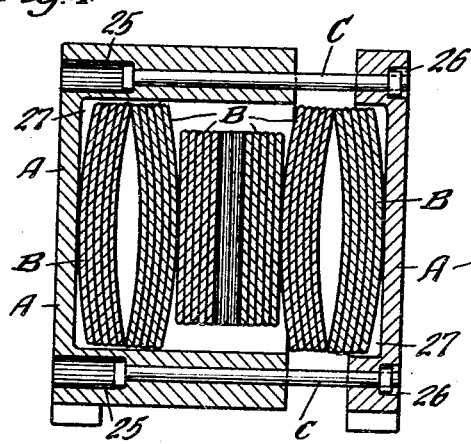
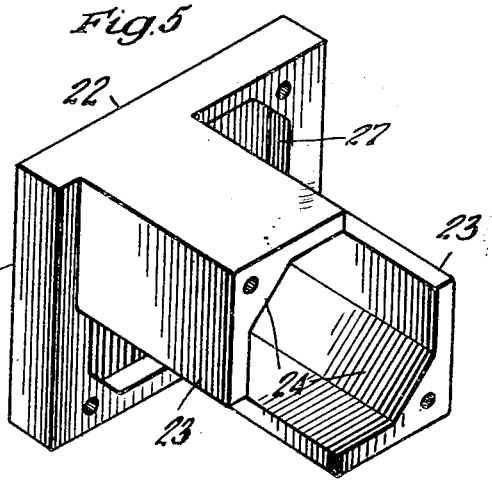
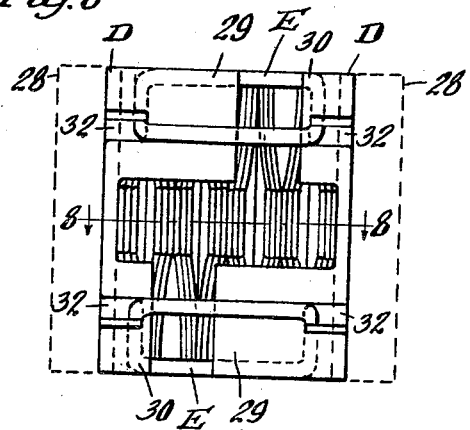
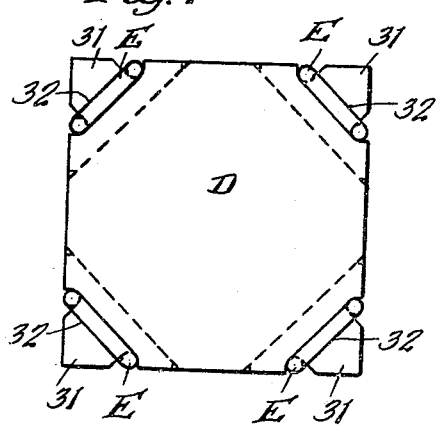
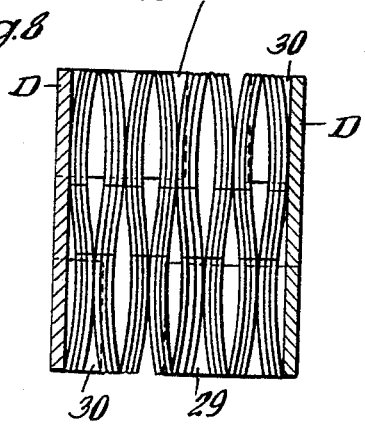

Patented May 19, 1931

1,806,264

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

DRAFT GEAR

Application filed July 27, 1928. Serial No. 295,652.

This invention relates to improvements in draft gears.

One object of the invention is to provide a draft gear for railway cars especially designed for use in connection with tandem side castings of railway draft riggings, including shock absorbing units arranged in tandem providing combined spring and frictional resistance, wherein the combined spring and frictional resistance, is produced by a plurality of laminated plate springs composing each unit, housed within telescoped follower casings.

Another object of the invention is to provide a shock absorbing unit for tandem draft gears, including follower casings having interengaging arms and a plurality of sets of curved spring plates disposed between said arms within the casings, the spring plates of each set being nested and each plate being reduced in width at opposite ends to provide for uniform flexing of each plate throughout the length thereof.

A further object of the invention is to provide a spring unit composed of a plurality of nested spring plates, wherein the cross sectional area of each plate between the opposite end portions is greater than the cross sectional area at said end portions, whereby uniform flexing of the plate throughout its length is assured.

A still further object of the invention is to provide a spring plate member for shock absorbing mechanisms of railway draft riggings, the cross sectional area of which plate decreases outwardly from the central zone thereof, whereby substantially uniform flexing of the plate throughout its length is had.

Yet another object of the invention is to provide a spring plate member for use in connection with shock absorbing mechanisms, which is of substantially uniform thickness and is reduced in width at opposite ends to provide for uniform flexing thereof.

A further object of the invention is to provide a spring plate member of octagonal shape for use as a shock absorbing element.

Still another object of the invention is to providing a shock absorbing unit, including relatively movable follower casings and spring resistance means within the casings, including a plurality of sets of spring plates of octagonal shape, the casings conforming in interior cross section to the outline of the plates, thereby preventing relative displacement of the plates of each set.

Another object of the invention is to provide a laminated plate spring unit for shock absorbing mechanisms, composed of a plurality of plates of octagonal shape and of ogee curved cross section.

Other and further objects of the invention will move clearly appear from the description and claims hereinafter following.

In the drawings, forming a part of this specification, Figure 1 is a horizontal sectional view of a portion of the underframe structure of a railway car, illustrating my improvements in connection therewith, the shock absorbing unit at the forward end of the mechanism being shown in plan and the shock absorbing unit at the rear of the mechanism being shown in horizontal section. Figure 2 is a front end elevational view of one of the shock absorbing units illustrated in Figure 1. Figure 3 is a transverse, vertical, sectional view, corresponding substantially to the line 3—3 of Figure 1. Figure 4 is a sectional view of a diagonal plane, corresponding substantially to the line 4—4 of Figure 2. Figure 5 is a detailed perspective view of one of the follower members employed in connection with my improved mechanism. Figure 6 is a plan view of a shock absorbing unit, ilustrating a different embodiment of the invention. Figure 7 is a front elevational view of the shock absorbing unit shown in Figure 6. And Figure 8 is a horizontal, longitudinal, sectional view, corresponding substantially to the line 8—8 of Figure 6.

In said drawings, 10—10 indicate the usual channel-shaped center or draft sills of the railway car underframe, to the inner sides of which are secured tandem side plates or stop castings 11—11. The side plates are provided with front and rear stop shoulders 12—12 and 13—13, intermediate or middle main stop shoulders 14—14, front limiting shoulders 15—15, and rear limiting shoulders 16—16. The inner end of the drawbar is designated by 17 and is secured to a yoke 18 of the tandem type, the yoke being provided with a central filler block 19 which is secured in the usual manner by rivets to the top and bottom arms of the yoke. Combined guide and supporting plates 20—20 are secured to the bottom portions of the stop castings, the same being supported by bolts 21—21 which are fixed to the stop castings in a well known manner.

Referring first to the embodiment of the invention illustrated in Figures 1 to 5, inclusive, my improved shock absorbing unit for tandem draft riggings includes, broadly, a pair of relatively movable follower casings A—A, a plurality of groups or sets of spring plates B—B disposed within the casings, and retainer bolts C—C disposed at the corners of the casings for holding the same assembled and maintaining the unit of overall uniform length.

Each follower member A, as most clearly shown in Figures 1, 4 and 5, comprises a relatively heavy, rectangular, plate-like portion 22, having a pair of inwardly projecting arms 23—23 at diagonally opposite corners thereof. As shown, each arm 23 comprises a vertically disposed section and a horizontally disposed section arranged substantially at right angles to each other.

The outer surface of the horizontally disposed section of each arm is substantially flush with the corresponding edge of the plate-like section of the follower and the vertically disposed section of the arm is spaced slightly inwardly of the corresponding side edge of the plate-like section. On the inner side, the horizontal portion of each arm is provided with a horizontally disposed abutment surface and the vertical portion of each arm is provided with a vertical abutment surface on the inner side thereof. As clearly shown in Figures 2, 3 and 5, the interior flat surfaces of the horizontal and vertical portions of each arm is connected by an angularly disposed flat surface 24 at the corner sections thereof.

When the sections of each unit are assembled, the arms 23 of one of the followers A are arranged so as to engage between the corresponding pair of arms 23 of the other follower A. As will be evident upon reference to Figures 2 and 3, the interior walls of the arms 23 of the two followers A define an opening of substantially octagonal shape, within which the groups of spring plates forming the laminated plate springs B are housed. The laminated plate springs B comprise six sets of plates, as clearly shown in Figures 1 and 4, each set being composed of a plurality of nested, curved plates. Each plate is of substantially octagonal shape, as shown in Figure 3, having relatively short end edges at opposite ends thereof which correspond in length to the width of the flat faces 24—24 of the opposed arms 23 of one of the followers A. The side edges of each plate are longer than the end edges, as shown in Figure 3, and are spaced from the opposed surfaces 24 of the arms 23 of the other follower A. As will be evident upon reference to Figures 2 and 3, the plates of each set are held in position by the opposed arms 23—23 of the followers. The opposite end edges of each plate, together with the diagonal edges immediately adjacent thereto, interfit with the vertical, horizontal and diagonal surfaces of the corresponding arms of one of the followers A, thereby preventing displacement of the plates. As shown in Figures 3 and 4, the sets of plates are so arranged that two adjacent sets have the concave surfaces thereof opposed. The two sets of plates at opposite ends of each unit have their convex outer surfaces bearing directly on the inner sides of the plate-like sections of the follower members A. The two central sets of plates also have the concave surfaces thereof opposed and, as shown in Figures 3 and 4, the plates of these two sets are arranged lengthwise between the arms of one of the followers A, while the sets of plates at the opposite ends of the unit are arranged lengthwise between the arms of the other follower A. In other words, the two sets of central plates are rotated through an angle of ninety degrees with respect to the remaining sets of plates.

The two followers A, composing each unit, are connected by the anchoring retainer bolts C—C, which, as hereinbefore pointed out, are disposed at the corners of the followers A. As clearly illustrated in Figure 4, one of the followers A, at diagonally opposite corners, is provided with openings 25, adapted to accommodate the heads of the retainer bolts for sliding movement, and the other follower A is provided with relatively shallow pockets 26—26 at the corresponding diagonal corners for accommodating the heads of the retainer bolts. The retainer bolts C are preferably so adjusted as to maintain the laminated plate springs under initial compression. As most clearly illustrated in Figures 4 and 5, the plate-like sections of the followers A are recessed on the inner sides thereof, to provide octagonal pockets 27—27 in which the outermost plates of the sets of spring plates are seated, the walls defining the pockets 27 coinciding with the walls formed on the inner sides of the arms 23 of the two followers.

Each shock absorbing unit, comprising the two followers A and the interposed sets of laminated plate springs B, is disposed within one of the pockets of the yoke member 18. As shown in Figure 1, the plate-like sections of the followers A are supported directly on the combined guide and supporting plates 20.

In the normal position of the parts, that is, the full release position, the plate section of one of the followers A of the front unit engages the stop shoulders 12 and the plate section of the other follower A of said unit engages the intermediate shoulders 14 at the corresponding end of the stop castings. The followers A of the rear unit cooperate respectively with the stop shoulders 13 and the stop shoulders 14 at the corresponding end of the stop castings. As hereinbefore pointed out, the vertical sections of the arms 23 are spaced inwardly from the vertical side edges of the plate-like sections of the followers A, thereby accommodating the arms 23 between the projecting portions intermediate the stop shoulders 15.

In the operation of my improved shock absorbing mechanism as illustrated in Figures 1 to 5, inclusive, assuming an inward or buffing action is applied to the drawbar, the followers A, at the forward ends of the two units, will be forced rearwardly by engagement with the inner end of the drawbar and the spacing or filler block 19 of the yoke, respectively, thereby compressing the laminated plate springs betwen the followers A of each unit, the rear follower of the front unit being held against movement by the stop shoulders 14 and the rear follower of the rear unit being held against movement by the stop shoulders 13. Inward movement of the front followers of each unit is limited by engagement of the plate-like sections thereof with the stop shoulders 15 and 16, respectively.

When a draft action is applied to the drawbar, the action will be substantially the same as in buff, the rear followers A of the front and rear units being pulled forwardly while the front followers of the corresponding units are held stationary by engagement with the stop lugs of the stop castings. When the actuating force is reduced, the tendency of the laminated spring members to expand restores the followers and other parts to their normal full release position.

Referring next to the embodiment of the invention illustrated in Figures 6, 7 and 8, each shock absorbing unit comprises a pair of follower members D—D which cooperate with front and rear follower blocks 28—28, shown in dotted lines in Figure 6. Each casing D comprises a heavy, plate-like end wall section, having a pair of relatively long, inwardly extending arms 29—29 at two opposite diagonal corners thereof, and a pair of relatively shorter, inwardly extending arms 30—30 at the other two diagonally opposite corners thereof. As shown in Figure 6, the arms 29 and 30 are slightly spaced apart and the arms 29 of one of the followers D are disposed in alignment with the arms 30 of the other follower and the adjacent ends of these arms are spaced apart a sufficient distance to permit full compression of the unit. The followers D are held assembled and in anchored relation by links E—E. As shown, each follower is cut away at the corners thereof, to provide projections 31—31 over which the links E may be engaged, each follower being slotted at each corner, as indicated at 32, to accommodate the corresponding end portion of one of the anchoring links E.

As shown in Figures 6 and 8, a plurality of sets of plate springs are disposed between the arms 29 and 30 of the followers D. Each set comprises a plurality of nested plates of ogee section. Each individual plate, as shown in Figure 7, is of substantially octagonal outline and the inner sides of the arms 29 and 30 of the followers are provided with diagonally extending flat surfaces which form abutments for diagonally opposed edges of the octagonal plates, thereby preventing relative displacement of the plates of each set. As will be evident upon reference to Figure 7, the octagonal plates employed in connection with the embodiment of the invention illustrated in Figures 6, 7 and 8 have the length and width thereof equal.

The operation of the shock absorbing mechanism illustrated in Figures 6, 7 and 8 is substantially the same as that of the invention described in connection with Figures 1 to 5, inclusive. An important advantage is obtained by providing the laminated springs, composed of a plurality of spring plates of octagonal shape, in that the plates are flexed more uniformly throughout their length during compression of the mechanism. In plate springs, wherein the plates are made of uniform width through their length, the cross sectional area of each plate is the same at all points throughout its length and the amount of metal contained in said sections is also uniform throughout the length of the plate. When a plate of this type is flexed, the greatest amount of flexing will occur centrally of the plate, while the end portions will be flexed to a slight degree only.

When the plates are provided with less metal at the end portions than at the center, as is the case in connection with the octagonal plates employed in connection with my invention, the end portions flex more easily and consequently the flexing of the plate throughout its length is substantially uniform, thereby obtaining the best results and the highest capacity and making use of the minimum amount of metal in each plate. The entire shock absorbing unit is thus reduced in weight, without reducing the efficiency of the same. By cutting away the corner sections of rectangular plate springs, so as to provide plates of octagonal shape, the metal at the corners cut away is saved, without reducing the efficiency of the plate spring.

While I have herein shown and described what I consider the preferred manner of carrying out the invention, the same is merely illustrative and I contemplate all changes and modifications which come within the scope of the claims appended hereto.

I claim:

1. In a shock absorbing mechanism, the combination with relatively movable followers, each follower having a pair of inwardly extending arms at diagonally opposite corners thereof, the arms of one follower engaging between the arms of the other follower, each of said opposed arms having a flat interior abutment surface and two angularly extending abutment surfaces at opposite sides of said flat surface; of means for yieldingly opposing relative approach of said followers interposed between the same, said means including a plurality of sets of spring plates, the plates of each of certain of said sets at opposite ends thereof being shaped to fit the abutment surfaces of the opposed arms of one of said followers to limit movement of the plates toward and from said arms and laterally of said arms.

2. In a shock absorbing mechanism, the combination with a pair of spring containers relatively movable toward each other, said containers having telescoping arms; of a laminated plate spring means disposed within said containers and embraced by said arms, said spring means including a plurality of sets of nested curved spring plates of octagonal outline and ogee curved section, said arms having interior abutment surfaces embracing and fitting opposite end portions of said octagonal plates.

In witness that I claim the foregoing I have hereunto subscribed my name this 25th day of July, 1928.

JOHN F. O'CONNOR.